United States Patent [19]
McCann

[11] Patent Number: 6,075,332
[45] Date of Patent: Jun. 13, 2000

[54] PREDICTIVE CONDUCTIVE ANGLE MOTOR CONTROL SYSTEM FOR BRAKE-BY-WIRE APPLICATION

[76] Inventor: Roy A. McCann, 3517 Kingswood, Kettering, Ohio 45420

[21] Appl. No.: 09/079,417

[22] Filed: May 14, 1998

[51] Int. Cl.[7] ............................................. H02K 17/32
[52] U.S. Cl. ......................... 318/432; 318/430; 318/433
[58] Field of Search ........................... 318/139, 430–490; 290/40 R; 477/155; 364/431.02, 424.01; 123/339.19, 352; 303/9.62, 3.1, 15, 96; 280/707, 142

[56] References Cited

U.S. PATENT DOCUMENTS

| | | | |
|---|---|---|---|
| 4,672,288 | 6/1987 | Abbondanti | 318/803 |
| 4,771,848 | 9/1988 | Namba et al. | 180/197 |
| 4,774,667 | 9/1988 | Kuraoka et al. | 364/426.02 |
| 4,791,573 | 12/1988 | Zemany et al. | 364/454 |
| 4,848,851 | 7/1989 | Kuraoka et al. | 303/100 |
| 5,036,266 | 7/1991 | Burke | 318/646 |
| 5,392,378 | 2/1995 | Tohyama | 388/803 |
| 5,408,411 | 4/1995 | Nakamura et al. | 364/424.01 |
| 5,460,434 | 10/1995 | Micke et al. | 303/9.62 |
| 5,481,648 | 1/1996 | Volponi et al. | 395/51 |
| 5,486,997 | 1/1996 | Reismiller et al. | 364/165 |
| 5,737,483 | 4/1998 | Inaji et al. | 388/805 |
| 5,740,045 | 4/1998 | Livshiz et al. | 364/491.03 |
| 5,776,031 | 7/1998 | Minowa et al. | 477/155 |
| 5,828,014 | 10/1998 | Goto et al. | 187/292 |
| 5,834,912 | 11/1998 | Nakamura et al. | 318/268 |
| 5,852,330 | 12/1998 | Yumoto | 290/40 R |
| 5,932,119 | 8/1999 | Kaplan et al. | 219/121.68 |
| 6,005,364 | 12/1999 | Acarnley | 318/632 |

Primary Examiner—Paul Ip
Attorney, Agent, or Firm—Jacox, Meckstroth & Jenkins

[57] ABSTRACT

A motor control system uses predictive signal processing techniques to estimate the value of the next motor torque request or command from a controller within a brake-by-wire system, then adjusts the control of the electric motor that applies pressure to actuate the brake calipers.

12 Claims, 3 Drawing Sheets

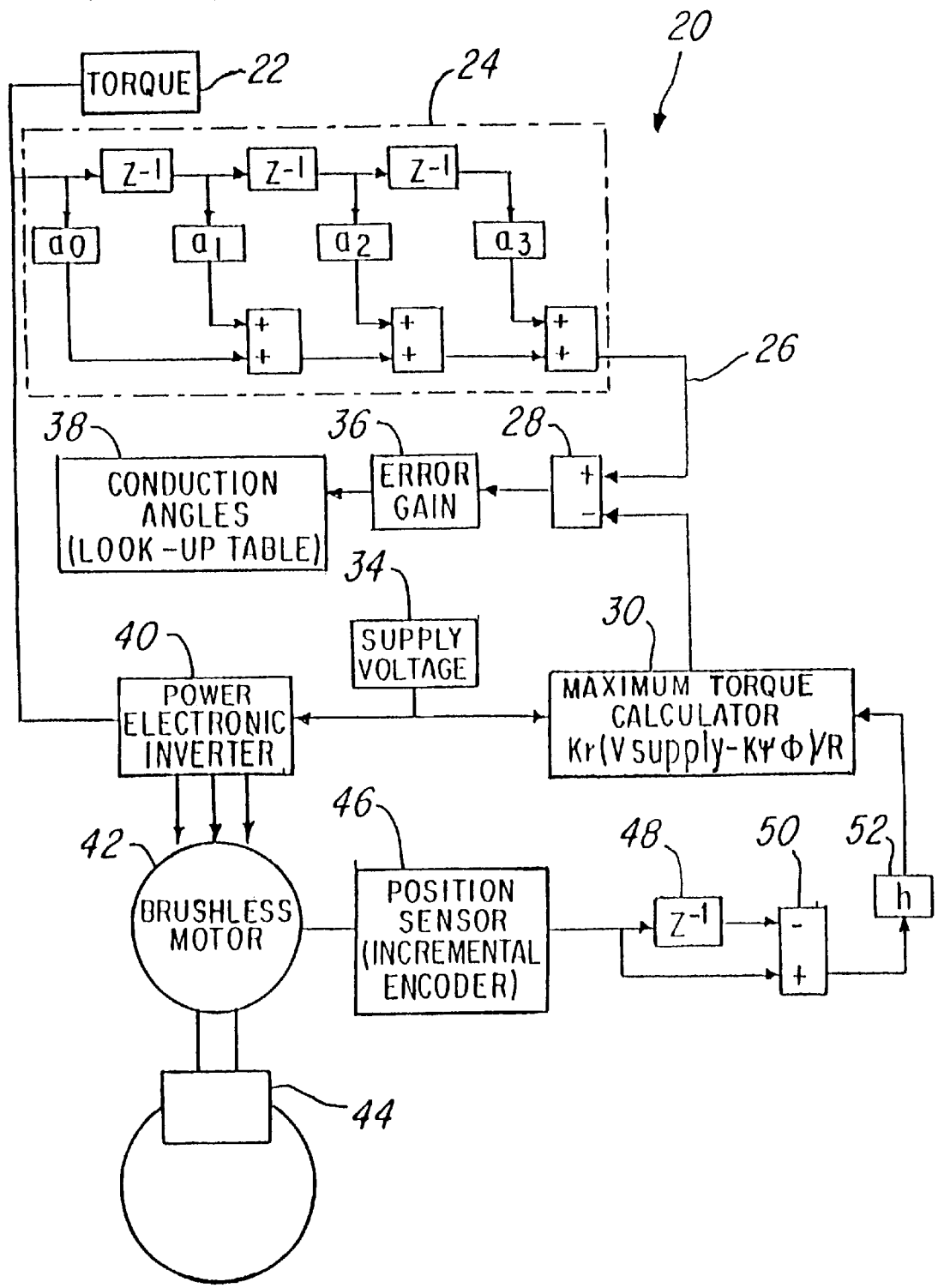

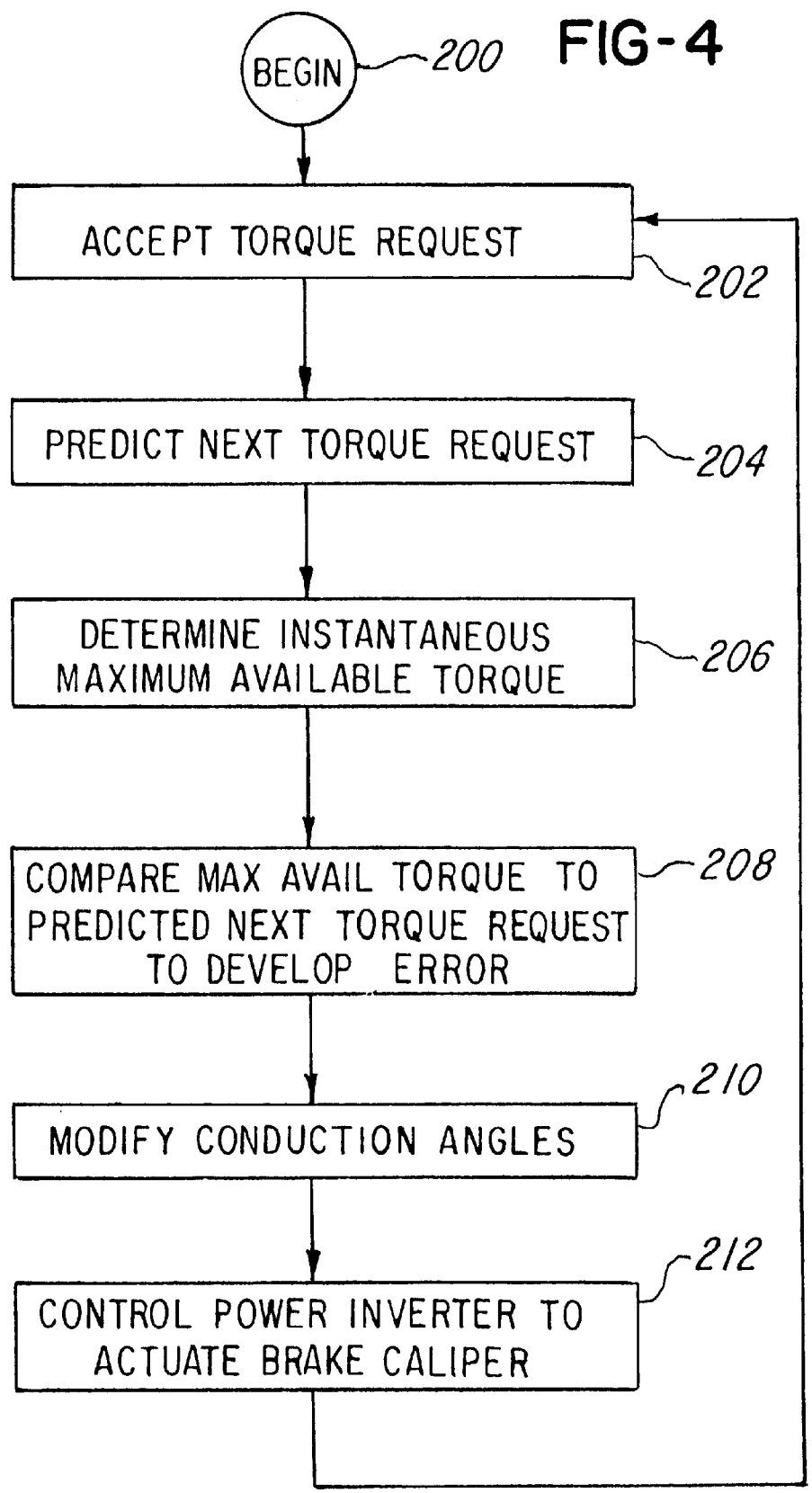

PREDICTIVE CONDUCTIVE ANGLE MOTOR CONTROL SYSTEM FOR BRAKE-BY-WIRE APPLICATION

FIELD OF THE INVENTION

The invention relates to an apparatus and a method that uses predictive signal processing techniques to estimate the trigger point at which to control an electric motor to actuate the brake caliper in a brake-by-wire application.

BACKGROUND OF THE INVENTION

During activation of an anti-lock braking system (ABS), the brake motor controller may request or command torque that exceeds the motor's available output torque, leading to slow ABS response time and poor ABS performance. This result is especially likely under conditions of high motor output shaft speed and low motor supply voltage. In ABS using permanent magnet brushless, switch reluctance, or any other type of an electric motor to apply brake caliper pressure, the motor's output torque capacity can be increased through phase advancing the commutation angle, i.e., so-called "field weakening." Such techniques, however, may cause rough transitions and instability when the vehicle is operating at the interface between normal braking and ABS activation. The present invention avoids these problems by including a predictor in the control scheme of the brake-by-wire system to anticipate the need for phase advance commutation in determining the value of the torque requested or commanded from the motor. The invention is based upon two principles:

- The field strength, and therefore the motor torque constant, can be electronically controlled in electric motors by modifying conduction angles.
- The conduction angles required for a particular torque and speed condition can be estimated using predictive signal processing techniques.

The first bullet point above can be better understood by examining FIG. 1, which shows the torque-speed trajectory of a typical electric motor during an ABS transient. When ABS is activated at time =0.0 seconds, the torque vs. speed characteristic for the electric motor is zero speed and zero torque as the motor begins to accelerate to reach a commanded torque value corresponding to a brake caliper apply pressure of typically 20 kN. It is desirable that the motor reach this output torque, and actuate the caliper apply this pressure, in a minimum amount of time. Without modifying the conduction angles (i.e., constant field control), the motor and thus the caliper pressure is constrained to the f1-torque curve. A typical brake-by-wire system with constant field control would require 0.220 sec. to reach the typical commanded caliper pressure of 20 kN. Modification of the conduction angles provides curves f2 through f5. As seen in FIG. 1, modification of the conduction angles can reduce the response time from the 0.220 sec. response time of f1 to the approximately 0.14 sec provided by f5.

Although the torque-speed characteristic of an electric motor can be modified continuously through field control, i.e., through continuous modification of conduction angles, such control proves disadvantageous because the motor current is increased significantly in the case of curve f5 compared to the case of curve f1. Higher motor current results in lower motor operating efficiency and greater thermal heating of the brake caliper. Thus, it is desirable to modify the conduction angles by the minimum amount required to provide adequate time response, and thus maximize the motor's efficiency. For the simple case of a constant torque command shown in FIG. 1, the minimum or optimum conduction angle modification is easily determined. In general, however, determination of the optimum conduction angle modification is complicated by the fact that the motor torque command is not constant. On the contrary, it varies continuously in a random-like fashion. The motor controller requests or communicates the motor torque command through a CAN serial link at 10 msec intervals.

Fortunately, as suggested by the second bullet point above, optimum conduction angles can be determined by using predictive signal processing techniques to estimate the motor torque value that will be commanded at the next 10 msec CAN interval. The maximum instantaneous motor torque available at the then current conduction angle is computed then compared to the predicted motor torque command. This error is used to adjust the conduction angles in a manner that meets the anticipated torque requirements without unnecessarily increasing average motor current.

SUMMARY OF THE INVENTION

The present invention is a system and method for predicting the optimum conduction angle at which to control an electric motor that applies pressure to actuate the brake calipers in a brake-by-wire system. The control system uses predictive signal processing techniques to estimate the value of the next motor torque request or command to be received from the brake-by-wire system controller, then adjusts the phase angle of the electric motor that applies pressure to actuate the brake calipers.

BRIEF DESCRIPTION OF THE DRAWINGS

FIG. 2 is a schematic diagram showing the predictive conduction angle control system used in a brake-by-wire application.

FIG. 4 is a flow-chart outlining the methodology employed in the predictive conduction angle control system of FIG. 1.

DETAILED DESCRIPTION OF THE PREFERRED EMBODIMENT

Figure 3:
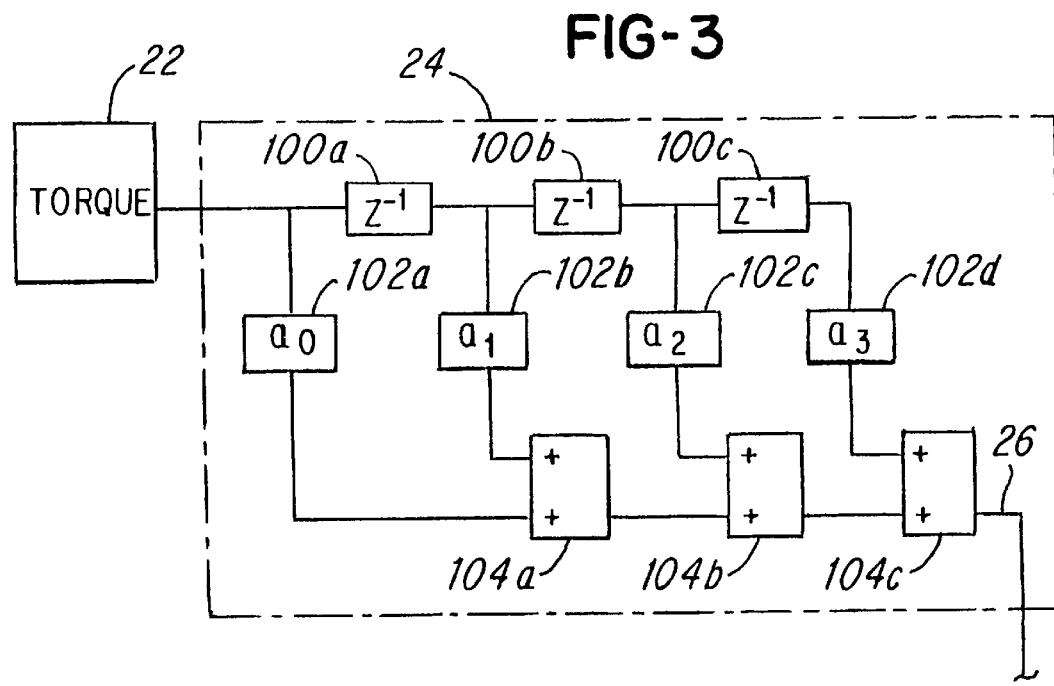
FIG. 3 is a schematic diagram of the predictor module employed in the predictive conduction angle control system of FIG. 1.

Referring now to FIGS. 2 and 3, in which the same numeral represents the same component in both views, FIG. 2 shows the conduction angle prediction and control system 20 used in a brake-by-wire application. The preferred embodiment of this system 20 is implemented using a TMS320F240 ('F240) digital signal processor from Texas Instruments, Incorporated, in which math functions are carried out in 16-bit fixed point arithmetic with 32-bit intermediate results.

FIG. 2 shows that the torque request or command 22 is input directly into the predictor 24, whose operation is explained below in greater detail with reference to FIG. 3. The preferred embodiment uses a first order prediction formula based upon extrapolation from the slope of the present and previous torque commands shown in FIG. 1. This method provides a simple deterministic approach to assigning values to prediction coefficients $a_0, a_1, a_2, a_3, \ldots$, $102a, 102b, 102c \ldots$, respectively.

$a_0=2$ $a_1=-1$ $\underline{T}(n)=2T(n)-T(n-1)$

Where:
- $a_0$=first prediction constant
- $a_1$=second prediction constant
- n=number of torque command
- T=actual torque commanded
- $\underline{T}$=predicted torque command The predicted torque 26 output from the predictor 24 is compared in torque comparator 28 to the value from the maximum torque calculator 30. The maximum available torque from the motor 42 is calculated in the maximum torque calculator 30 using the equation:

$$T_{MAX}(n)=K_T(n)[V_{SUPPLY}(n)-K_V(n)\omega(n)]/R$$

Where:
- $T_{MAX}$=maximum available torque
- $K_T$=Torque constant (Newton-meters per amp)
- $V_{SUPPLY}$=supply voltage
- $K_V$=Voltage Constant (Volts per radian per second)
- $\omega$=angular velocity of the motor's output shaft
- R=resistance of the motor phase coil The error between the predicted torque 26 and the maximum available torque from the maximum torque calculator 30 is multiplied by a constant gain 36 to develop a phase advance signal for a permanent magnet dc motor, or to calculate (d,t) parameters for a switched reluctance motor according to the method outlined in patent application Ser. No. 08/856,370 (AESI 4591), now U.S. Pat. No. 5,838,133, which is incorporated by reference.

$$\theta_{adv}(n)=G[\underline{T}(n)-T_{MAX}(n)]$$

Where:
- $\theta_{adv}$=Conduction Angle Control Variable
- G=Conduction Angle Gain (Constant)

Figure 1:
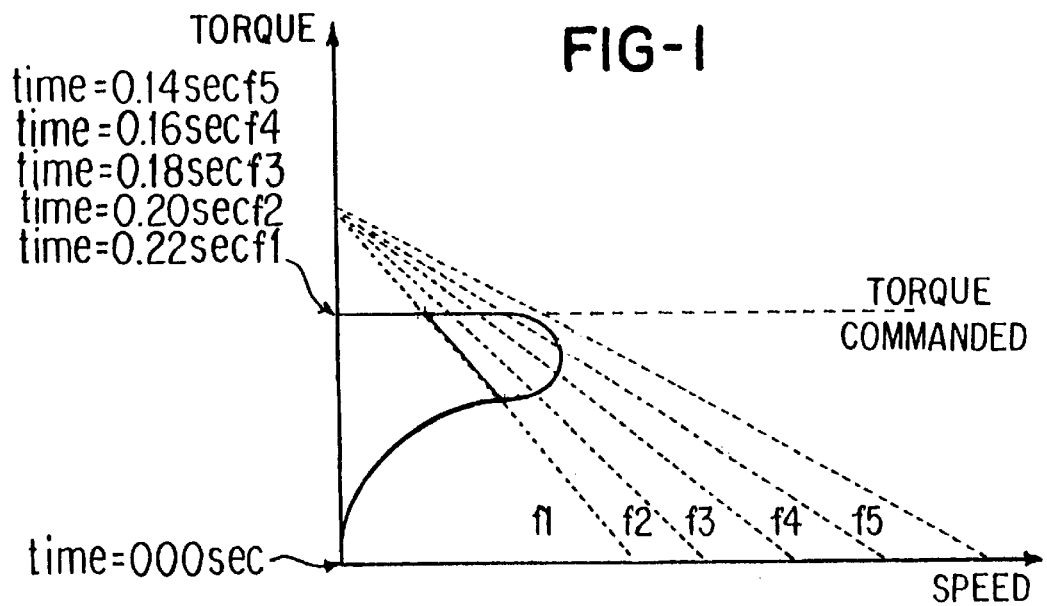
FIG. 1 is a graphical representation of the torque vs. speed characteristics of an electric motor and the corresponding time intervals at which a certain commanded torque is achieved.

Varying the conduction angle control variable provides the means for operating the motor 42 along the curves in $f_1$, $f_2$, ..., $f_5$ in FIG. 1. $\theta_{adv}$ is proportional to the difference between the predicted torque $\underline{T}$ and the maximum available torque $T_{max}$. When $\underline{T}$ is much less than $T_{max}$, there is a surplus of available torque and $\theta_{adv}$ is set to a value corresponding to $f_1$. As $\theta_{adv}$ is reduced in the event that $\underline{T}$ becomes closer to $\underline{T}_{max}$, the conduction angles associated with $f_2$, ..., $f_5$ are progressively selected in a continuous manner. When $\theta_{adv}$ goes to zero or becomes negative, the conduction angle variable goes to one that corresponds to $f_5$. The conduction angles associated with $f_5$ represent the limit of the speed-torque envelope available from a particular motor configuration. Conduction angle modification to achieve a continuum of curves as in FIG. 1 is dependent upon the motor type (e.g., permanent magnet brushless, switched reluctance, three phase, four phase, 4 pole, 6 pole, ... ).

The phase advance signal output from error gain module 36 is used to modify conduction angles taken from a conduction angles look-up table stored in the 'F240 ROM. These modifications are made according to the equations given immediately below to produce updated conduction angles 38.

$$\theta_{on}(n+1)=\underline{\theta}_{on}-\theta_{adv}(n)$$

$$\theta_{off}(n+1)=\underline{\theta}_{off}-\theta_{adv}(n)$$

Where:
- $\theta_{on}$(n+1)=Modified turn-on angle used at time n+1
- $\underline{\theta}_{on}$=Reference turn-on angle
- $\theta_{adv}$(n)=Conduction angle control variable
- $\theta_{off}$(n+1)=Modified turn-off angle used at time n+1
- $\underline{\theta}_{off}$=Reference turn-off angle The updated conduction angles 38 (i.e., "turn-on" and "turn-off" angles) are used in conjunction with the original torque request or command 22 in a conventional manner to control the power electronic converter 40, which is powered by a conventional supply voltage 34. The position of the motor 42, which actuates the brake calipers 44, is measured by an incremental encoder 46. The output of incremental encoder 46 is input to the delay operator 48 whose output is compared with the output of the incremental encoder 46 within position comparator 50 to determine the motor speed 52 according to the following equation:

$$\omega(n)=\Delta t[\theta_{motor}(n)-\theta_{motor}(n-1)]$$

Where:
- $\omega$=motor speed
- $\Delta t$=time interval factor
- $\theta_{motor}$=motor position at time n and n−1

The motor speed 52 is subsequently used by maximum torque calculator 30 in determining the maximum torque $T_{MAX}(n)$.

Referring now to FIG. 3, the operation of predictor 24 will be explained in greater detail. The torque request or command is input to the predictor 24 where it is combined with prediction constant $a_0$, 102a and shifted by delay operator $Z^{-1}$, 100a. The output from the delay operator $Z^{-1}$, 100a is then combined with the prediction constant $a_1$, 102b and shifted by delay operator $Z^{-1}$, 100b. The output from predictor constants $a_0$, 102a and $a_1$, 102b are then compared by prediction comparator 104a. The output from delay operator $Z^{-1}$, 100b is then combined with prediction constant $a_2$, 102c and shifted by delay constant $Z^{-1}$, 100c. The output from predictor constant $a_2$, 102c is then compared to the output from prediction comparator 104a by prediction comparator 104b. The output from delay operator $Z^{-1}$, 100c is then combined with prediction constant $a_3$, 102d and the result compared to the output from prediction comparator 104b by prediction comparator 104c to produce the predicted torque 26.

Referring now to FIG. 4, the method employed by the predictive conduction angle motor control system 24 begins in step 200. In step 202, the predictor 24 accepts a torque request or command 22 from the brake system controller. In step 204, the next torque command to be received from the brake-by-wire system controller is predicted. In step 206, the instantaneous maximum available torque of the electric motor is calculated. In step 208, a torque error signal is determined by comparing the instantaneous maximum available torque to the next received torque command. In step 210, the phase advance angle for the permanent magnet brushless motor or the conduction angle for the switched reluctance motor is modified based upon the torque error signal. Finally, in step 212, the electric motor is controlled to actuate the brake caliper through a command from the power electronic inverter 40 in accordance with the modification of the optimum conduction angle. This process repeats itself as the next torque request or command 22 is accepted by the predictor 24 over the CAN link with the brake-by-wire system controller during the next cycle.

Other electric motor control systems with alternative schemes for determining the next torque request or command could be implemented using the disclosed new and innovative scheme for optimizing conduction angles. In addition to the deterministic approach discussed as the preferred embodiment, the present invention may be implemented using statistical methods to predict the value of the next torque request or command. In addition, a "sensorless" approach, in which the known properties of the electric motor such as current and flux values at particular points in time, could be used to supply information regarding the rotor position. These and other alternative implementations and minor variations of the disclosed preferred embodiment will be apparent to those skilled in the art, and may still properly fall within the scope of the following claims.

I claim:

1. An apparatus for predicting the optimum conduction angle of an electric motor in response to a torque request command, comprising:
   means for issuing the torque request command; and
   a predictor for receiving said torque request command and outputting a predicted torque command representing the estimated value of the next torque command to be received, prior to receipt of said next torque command.

2. The apparatus of claim 1, further comprising:
   a rotor position detector for supplying information related to the position of said rotor;
   a maximum torque calculator, in communication with said rotor position detector, for outputting a maximum instantaneous torque signal;
   a torque comparator, in communication with said predictor and said maximum torque calculator, for comparing the maximum instantaneous torque signal to the predicted torque command and outputting an torque error signal.

3. The apparatus of claim 2, further comprising:
   a conduction angle computer, in communication with said torque comparator, for outputting an optimal conduction angle signal based upon said torque error signal.

4. The apparatus of claim 3, further comprising:
   a power electronic converter, in communication with said conduction angle computer and said motor, for receiving said torque request command and said optimal conduction angle signal and outputting a motor control signal.

5. Apparatus according to claim 1, wherein the electric motor actuates a brake in a vehicle.

6. Apparatus according to claim 5, wherein the electric motor applies pressure to a brake caliper.

7. An apparatus for controlling an electric motor to actuate a brake caliper in a brake-by-wire system, comprising:
   a predictor for receiving a torque request command from the system controller of said brake-by-wire system and outputting a predicted torque command representing the predicted value of the next torque command to be received from said system controller;
   a maximum torque calculator, in communication with said position sensor outputting the maximum instantaneous torque signal;
   a rotor position detector for supplying information to said maximum torque calculator related to the position of said rotor; and
   a torque comparator, in communication with said predictor and said maximum torque calculator, for comparing the maximum instantaneous torque signal to the predicted torque command and outputting an torque error signal.

8. The apparatus of claim 7, further comprising:
   a conduction angle computer, in communication with said torque comparator, for outputting an optimal conduction angle signal based upon said torque error signal; and
   a power electronic converter, in communication with said conduction angle computer and said motor, for receiving said torque request command and said optimal conduction angle signal and outputting a motor control signal.

9. A method for controlling an electric motor, comprising the steps of:
   estimating the next received torque command from a controller;
   determining a torque error signal by comparing the instantaneous maximum available torque to said next received torque command;
   controlling said electric motor based upon said torque error signal.

10. A method for controlling an electric motor to actuate a brake caliper in a brake-by-wire system, comprising the steps of:
    accepting a torque request command from a controller within said brake-by-wire system;
    estimating the next received torque command from said controller;
    determining the instantaneous maximum available torque of said electric motor;
    determining a torque error signal by comparing said instantaneous maximum available torque to said next received torque command;
    controlling said electric motor based upon torque error signal.

11. A method for controlling a switched reluctance motor to actuate a brake caliper in a brake-by-wire system, comprising the steps of:
    accepting a torque request command from a controller within said brake-by-wire system;
    estimating the next received torque command from said controller;
    determining the instantaneous maximum available torque of said switched reluctance motor;
    determining a torque error signal by comparing said instantaneous maximum available torque to said next received torque command;
    modifying a conduction angle of said switched reluctance motor based upon said torque error signal; and
    controlling said switched reluctance motor based upon said modification of said conduction angle.

12. A method for controlling a permanent magnet brushless motor to actuate a brake caliper in a brake-by-wire system, comprising the steps of:
    accepting a torque request command from a controller within said brake-by-wire system;
    predicting the next received torque command from said controller;
    determining the instantaneous maximum available torque of said electric reluctance motor;
    determining a torque error signal by comparing said instantaneous maximum available torque to said next received torque command;
    modifying the phase advance of said permanent magnet brushless motor based upon said torque error signal; and
    controlling said permanent magnet brushless motor based upon said modification of said phase advance.

* * * * *

UNITED STATES PATENT AND TRADEMARK OFFICE
CERTIFICATE OF CORRECTION

PATENT NO.    : 6,075,332                                    Page 1 of 1
DATED         : June 13, 2000
INVENTOR(S)   : Roy A. McCann It is certified that error appears in the above-identified patent and that said Letters Patent is hereby corrected as shown below:

<u>Title page,</u>
After item [22], please insert the following paragraph:

[60]            -- Cross Reference to Related Application
Provisional application Serial No. 60/046,476 filed May 14, 1997. --

<u>Column 1,</u>
Line 4, after the title, please insert the following paragraph:

-- Cross Reference to Related Application
       This application claims the priority of Provisional Application Serial
No. 60/046,476 filed May 14, 1997. --

<u>Column 5,</u>
Line 31, please delete "an torque" and insert -- a torque --.
Line 62, please delete "an torque" and insert -- a torque --.

<u>Column 6,</u>
Line 12, after "command" insert -- and --.
Line 27, after "command" insert -- and --.

Signed and Sealed this

Twenty-fifth Day of March, 2003

JAMES E. ROGAN
*Director of the United States Patent and Trademark Office*